United States Patent
Bhatia

[19]
[11] Patent Number: 5,898,569
[45] Date of Patent: Apr. 27, 1999

[54] POWER CABLE HEAT EXCHANGER FOR A COMPUTING DEVICE

[75] Inventor: Rakesh Bhatia, San Jose, Calif.

[73] Assignee: Intel Corporation, Santa Clara, Calif.

[21] Appl. No.: 08/846,113

[22] Filed: Apr. 25, 1997

[51] Int. Cl.[6] .................................................. H05K 7/20
[52] U.S. Cl. ..................... 361/700; 165/80.2; 165/80.3; 174/15.2; 174/16.3; 361/687; 361/695; 439/485; 439/487
[58] Field of Search .............................. 165/80.2, 80.3, 165/185, 104.33; 174/15.2, 16.3; 361/687, 694–695, 700, 704, 709–710, 826–827; 439/485, 487

[56] References Cited

U.S. PATENT DOCUMENTS

| | | | |
|---|---|---|---|
| 5,007,858 | 4/1991 | Daly et al. | 439/485 |
| 5,037,313 | 8/1991 | Lindén et al. | 361/690 |
| 5,077,637 | 12/1991 | Martorana et al. | 174/16.3 |
| 5,148,354 | 9/1992 | Roth | 439/485 |
| 5,255,109 | 10/1993 | Klein | 872/364 |
| 5,424,913 | 6/1995 | Swindler | 179/807 |
| 5,427,502 | 6/1995 | Hudson | 218/921 |
| 5,430,609 | 7/1995 | Kikinis | 116/331 |
| 5,441,576 | 8/1995 | Bierschenk et al. | 248/537 |
| 5,475,563 | 12/1995 | Donahoe et al. | 330/13 |
| 5,513,070 | 4/1996 | Xie et al. | 357/449 |
| 5,522,712 | 6/1996 | Winn | 164/80 |
| 5,550,710 | 8/1996 | Rahamim et al. | 303/318 |
| 5,559,675 | 9/1996 | Hsieh et al. | 411/545 |
| 5,598,320 | 1/1997 | Toedtman et al. | 399/409 |

*Primary Examiner*—Gregory Thompson
*Attorney, Agent, or Firm*—Jeffrey S. Draeger

[57] ABSTRACT

A heat exchange apparatus for a computing device. A heat dissipating cable connector for the computing device includes a heat dissipation mechanism. The heat dissipation mechanism in the heat dissipating cable connector is removably thermally coupled to a heat transfer element which is configured to transfer heat from an electronic component to the heat dissipation mechanism.

19 Claims, 5 Drawing Sheets

POWER CABLE HEAT EXCHANGER FOR A COMPUTING DEVICE

FIELD OF THE INVENTION

The present invention pertains to the field of heat removal from electronic components. More particularly, this invention relates to heat removal from a portable computing device.

BACKGROUND

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base the portable computer system. A processor is one component that generates a large amount of heat in a typical processor system. Other electrical components which also generate heat include memory circuits, power supply circuits, and circuit boards such as video card.

Maintaining operating temperatures of computer system components below certain levels is important to ensure performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Since the computer base size is generally kept to a minimum, and the computer base contains both the input device and numerous other electronic components, there may be inadequate space to dissipate enough heat to keep the electronic components within their acceptable range of operating temperatures. Additionally, heat dissipation through the bottom of the base is limited because the computer is usually operated on a relatively flat low conductance surface.

One prior art method for removing heat from the base of a portable computing device involves transferring heat from the base of the device to the display. The technique of transferring heat to the display is limited due to the thermal and mechanical difficulties involved with transferring heat through the hinge of the computing device. Additionally, using this technique, all of the heat is dissipated by the portable computing device.

Many portable computing devices having power cables which allow connection to a power supply such as an electrical outlet. A power supply "brick" (an enlarged, often rectangular, portion of the cable) is often included at some point in the power supply cable to perform a power conversion. For example, a brick may include a transformer and a rectifier circuit to convert alternating current power to direct current power. The brick is typically located at either the end of the power cable which plugs into the outlet or at some intermediate point in the cable.

The prior art does not take advantage of the power supply brick as a type of cable connector which may be used as a means of heat dissipation. Nor does the prior art utilize other connectors or attachments, such as networking cards, to dissipate heat.

SUMMARY

A heat exchange apparatus for a computing device is disclosed. A heat dissipating cable connector for the computing device includes a heat dissipation mechanism. The heat dissipation mechanism in the heat dissipating cable connector is removably thermally coupled to a heat transfer element which is configured to transfer heat from an electronic component to the heat dissipation mechanism.

BRIEF DESCRIPTION OF THE FIGURES

The present invention is illustrated by way of example and not limitation in the figures of the accompanying drawings.

DETAILED DESCRIPTION

The present invention provides a heat exchanger for a computing device. In the following description, numerous specific details such as component types, heat conductive materials, and heat dissipation component locations, are set forth in order to provide a more thorough understanding of the present invention. It will be appreciated, however, by one skilled in the art that the invention may be practiced without such specific details.

The present invention provides numerous techniques for removing heat from a portable computing device through a power cable connector or another attachment. With the ability to remove additional heat, it may become possible to operate components such as a processor in a portable computing device at a higher power level by either increasing the supplied voltage, reducing clock throttling, or increasing the operating frequency of the processor. As a result, a portable computing device may be able to obtain higher performance while a power cable or other attachment is connected.

Figure 1:
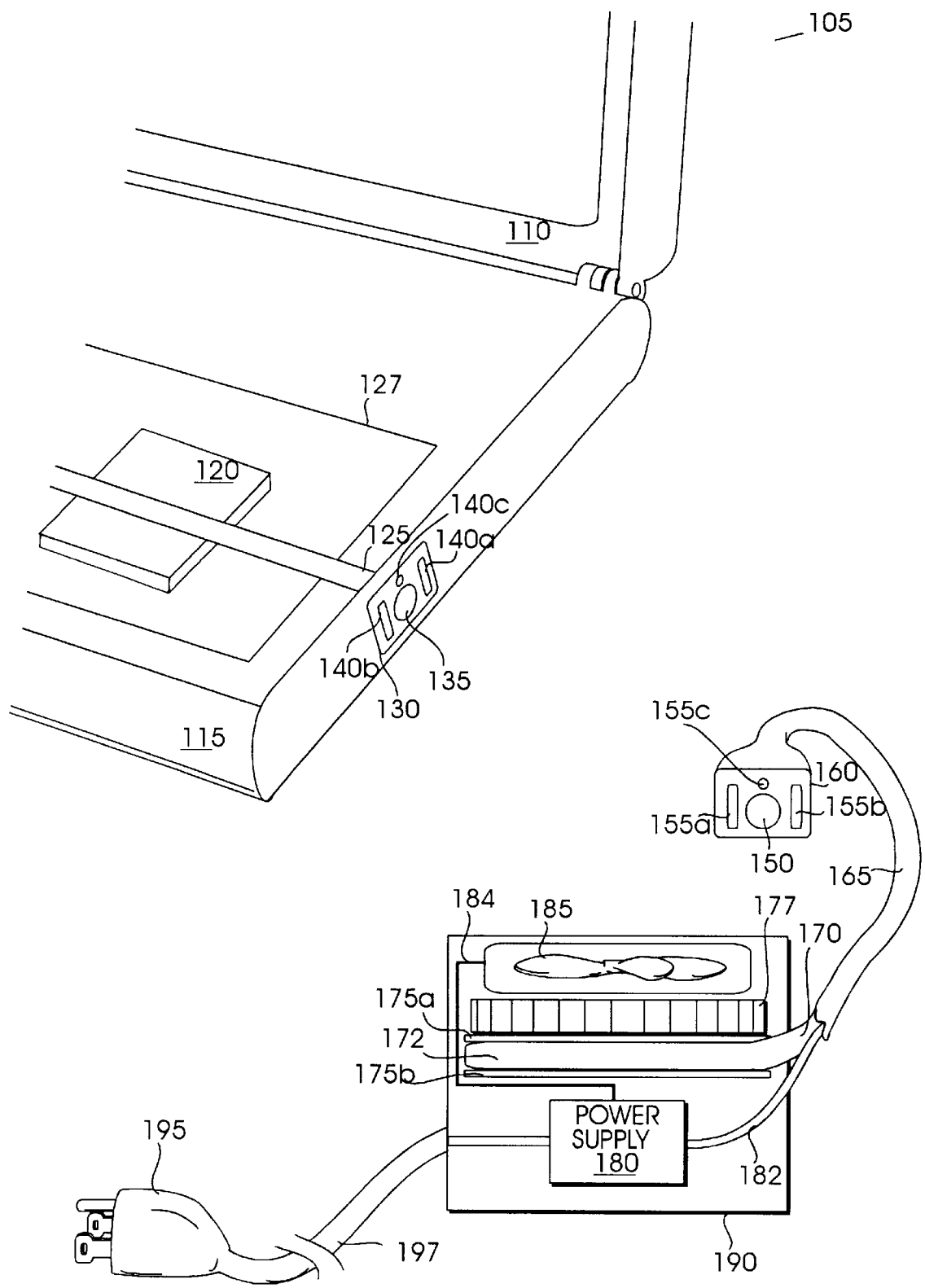
FIG. 1 illustrates one embodiment of a computing device using a power cable for heat dissipation according to the present invention.

FIG. 1 illustrates one embodiment of the present invention. A portable computing device 105 may be a laptop computer, a notebook computer, or any other computing device which may need additional cooling capacity when connected to a power outlet or other attachment. The portable computing device includes a base 115 and a display 110 hingedly mounted at one edge of the base 115. Additionally, the portable computing device 105 includes an electronic component 120 mounted on a circuit board 127.

In one embodiment, the electronic component 120 is a processor and the circuit board 127 is a motherboard; however, other components or regions of the portable computing device may be cooled according to the present invention. In a typical laptop or notebook computer, many other components are present. A memory system, a disk and/or CD ROM drive, audio and video hardware, connectivity (i.e., network and modem) hardware, as well as a power supply may all be present. These or other individual components as well as circuit boards or regional heat sinks within the portable computing device 105 may be cooled according to the present invention.

A heat transfer element 125 conveys heat away from the electronic component 120 to a receptacle 130. The receptacle is formed at an exterior surface of the base 115, although the surface may be recessed and/or the receptacle may be protected by a covering or a door when not in use. The receptacle may be either formed as a separate component and affixed to the base, or may form a part of the base housing itself.

The receptacle includes a thermal mating connector 135, and a plurality of electrical connectors 140a, 140b, and 140c. In one embodiment, the receptacle 130 is recessed into the housing of the portable computing device 105 and includes male electrical and thermal connectors. In other embodiments, female connectors, or a combination of male and female connectors, may be used.

A plug 160 includes a plurality of electrical connectors 155a, 155b, and 155c which cooperatively engage the connectors 140a, 140b, and 140c. A thermal mating connector 150 thermally engages the thermal mating connector 135 when the plug mates with the receptacle. A thermal-electrical cable 165 connected to the plug 160 carries a set of electrical conductors 182 and a flexible thermal conductor 170 to a cable connector, power supply brick 190.

Receptacles and plugs are well known mechanisms and any appropriate prior art connector, receptacle, or plug structure may be used. For example, the mechanical engaging structures may be changed, as may the number, type, or arrangement of the particular electrical connectors used.

Additionally, any appropriate thermal connectors may be used. In one embodiment, the heat transfer element 125 is a heat pipe with an open cylindrical end for the thermal mating connector 135. The open cylindrical end is adapted to engage one end of a flexible heat pipe extending from the plug 160. The engaging portion flexible heat pipe may be mounted in a similarly shaped copper or other rigid heat conductive connector to ensure proper mating with the receptacle. In other words, an end portion of the heat pipe may be encased in a metal connector. Thus, in one embodiment, the flexible heat pipe or a heat conductive connector attached thereto forms the thermal mating connector 150, and the flexible heat pipe forms the flexible thermal conductor 170 extending through the thermal-electric cable 165 and into the power supply brick 190.

The power supply brick 190 is also a heat dissipation brick because it contains heat dissipation mechanisms in addition to power supply components. In alternate embodiments, these components could be supplied in separate housings or completely independently of each other. The combination, however, advantageously reduces the number of components outside the portable computing device 105 and allows the use of active (i.e., requiring electricity) heat dissipation mechanisms. Additionally, in other embodiments, the brick may take different shapes (cylindrical, square, or otherwise), and may perform either no function beyond heat dissipation or one or more additional functions such as power conversion or a data communication function.

As illustrated, the power supply brick 190 includes a power supply circuit 180. A plug 195 supplies alternating current from an electrical outlet to the power supply 180 through a power cable 197. The power supply 180 provides power from the power supply circuit 180 to the portable computing device 105 via the electrical conductors 182 and the electrical connectors 155a, 155b, and 155c. The power supply also supplies power to a fan 185 via a second set of conductors 184.

In the illustrated embodiment, the fan 185 cools a heat sink 177 which is attached to a portion 172 of the flexible thermal conductor 170 by a top heat dissipation plate 175a. A bottom heat dissipation plate 175b further removes heat from the flexible thermal conductor 170. In one embodiment, the heat dissipation plates 175a and 175b are copper. In other embodiments, aluminum or other heat conductive materials may be used. Additionally, one or both of the plates 175a and 175b may be eliminated and the heat sink 177 may be directly attached to the flexible thermal conductor 170.

When the plug 195 is connected to an outlet and the plug 160 is mated with the receptacle 130, the portable computing device can receive additional power to improve the performance of certain components such as a microprocessor. The additional heat dissipation mechanism provided by the power cable and brick combination allows such additional power consumption without overheating or damaging components.

Figure 2:
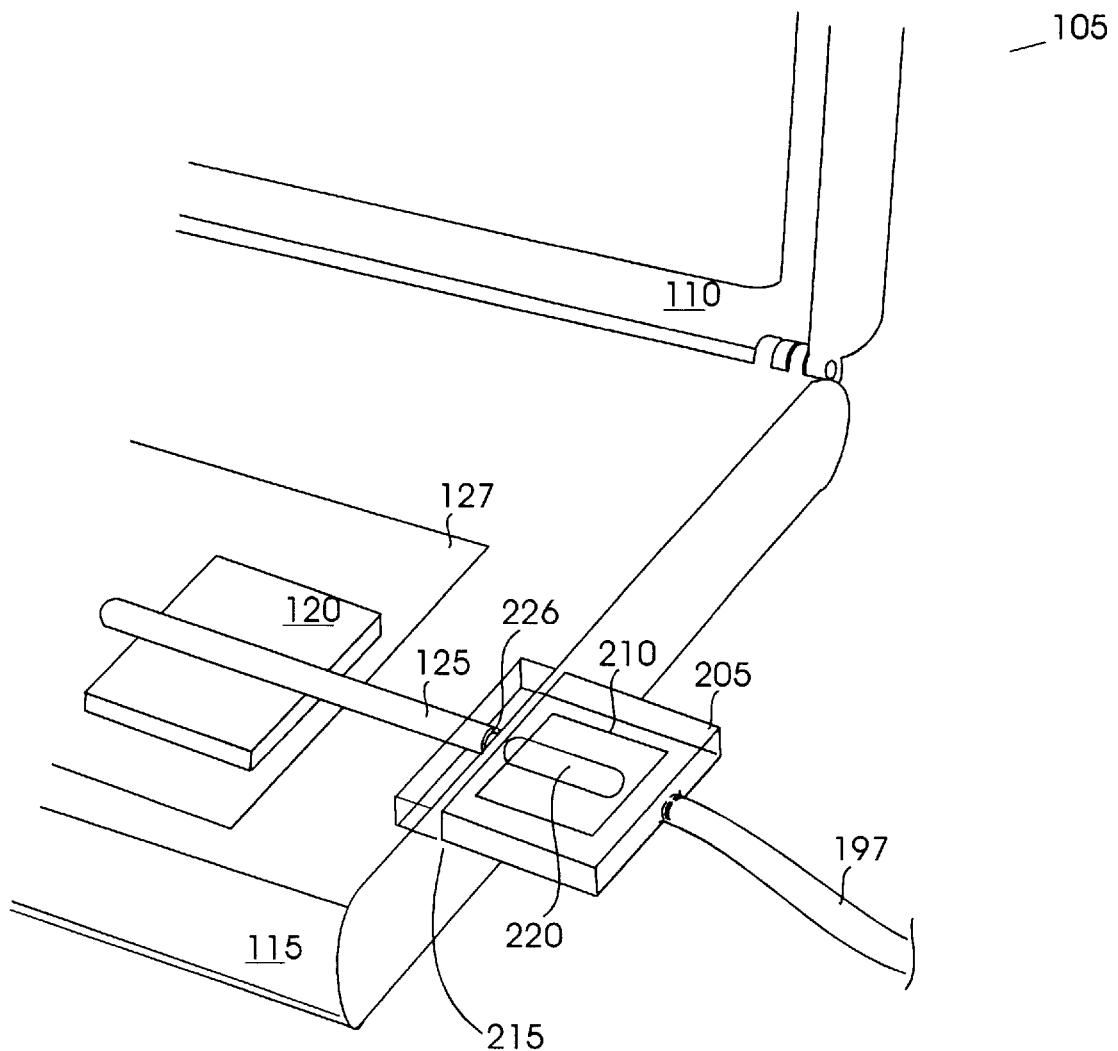
FIG. 2 illustrates another embodiment of the present invention in which a computing device uses an attachment abutting the computing device for power dissipation.

Another embodiment of the present invention is illustrated in FIG. 2. In this embodiment, an attachment 205 directly abuts the base 115 and is mechanically engaged by an elongated receptacle 215. Since the attachment abuts the base 115 and the elongated receptacle allows a larger thermal connections, more efficient transfer of heat to the attachment 205 may be achieved than when the heat dissipation mechanism is more distant. The large direct abutment may also increase the thermal mating options.

The attachment 205 is a second type of cable connector which abuts the personal computing device 105. The attachment 205 may be a heat dissipation brick or may contain other circuitry for performing other functions such as providing a network or communications interface. In the illustrated embodiment, the attachment 205 provides heat dissipation using a heat sink 210 and provides power through the power cable 197. The heat sink 210 dissipates heat from a second heat transfer element 220 which mates with a open cylindrical end 226 of the first heat transfer element 125 when the attachment 205 is mated with the base 115.

Figure 3A:
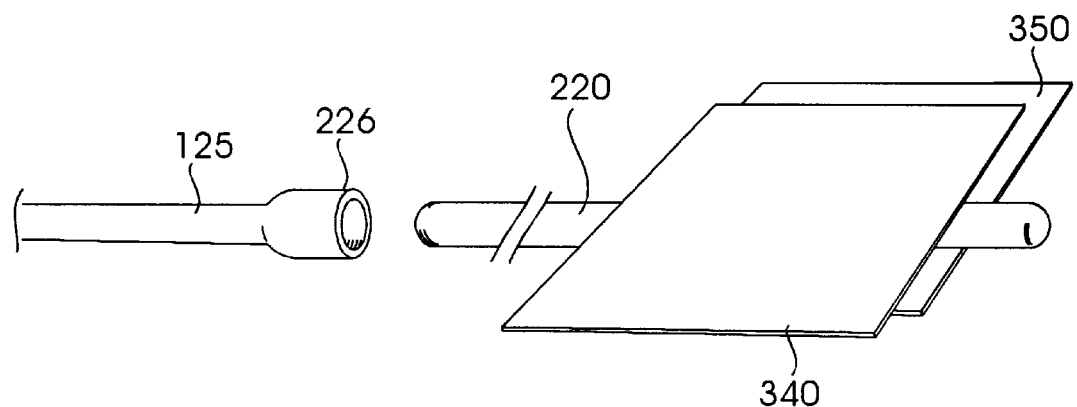
FIGS. 3a and 3b illustrate embodiments of thermal mating connectors which may be used in some embodiments of the present invention.

Further details of one embodiment of this thermal mating are shown in FIG. 3a. The open cylindrical end 226 of the heat transfer element 125 is adapted to engage the second heat transfer element 220. In one embodiment, both heat transfer element 125 and 220 are cylindrical heat pipes. In alternate embodiments, these heat pipes may be shaped differently and/or may form other engaging heat conductive connections. For instance, the heat pipes may be rectangular or differently shaped, and the female end may fully encircle the male end or may have two or more engaging portions which partially surround the male end. The heat sink 210 may be formed by a pair of heat dissipation plates 340 and 350 which are copper in one embodiment. Alternately, aluminum or other metals may be used. Additionally, the heat sink may comprise more complicated structures including a fan or other known heat dissipation devices in alternate embodiments.

The thermal mating connector arrangement of FIG. 3a may be used in a number of embodiments of the present invention. As illustrated by the disconnect in the second heat transfer element 220, the heat dissipation plates 340 and 350 may be in close proximity to this thermal connection (e.g., in the attachment 205 in FIG. 2) or more may be separated by a thermal cable (e.g., in the brick of the embodiment of FIG. 1).

Figure 3B:
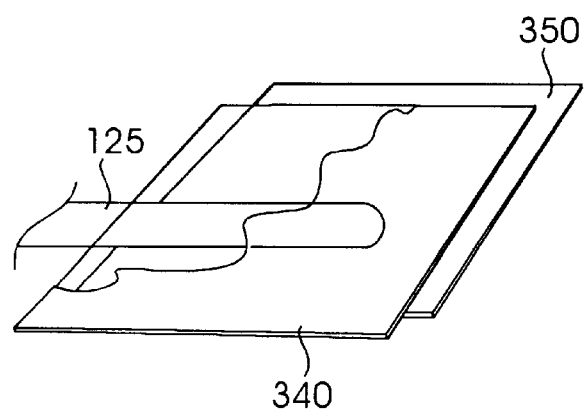

One alternate thermal mating connector arrangement is shown in FIG. 3b. FIG. 3b illustrates the use of two plates 340 and 350 to thermally engage the heat transfer element 125 by direct contact. This type of thermal connection may also be used to mate with the flexible heat conductor 170 (rather than the heat transfer element 125 as shown) in the brick 190 of FIG. 1. A hardened coating such as molybdenum may be appropriate for these and the prior thermal matings in order to reduce wear on the interfacing parts.

Figure 4:
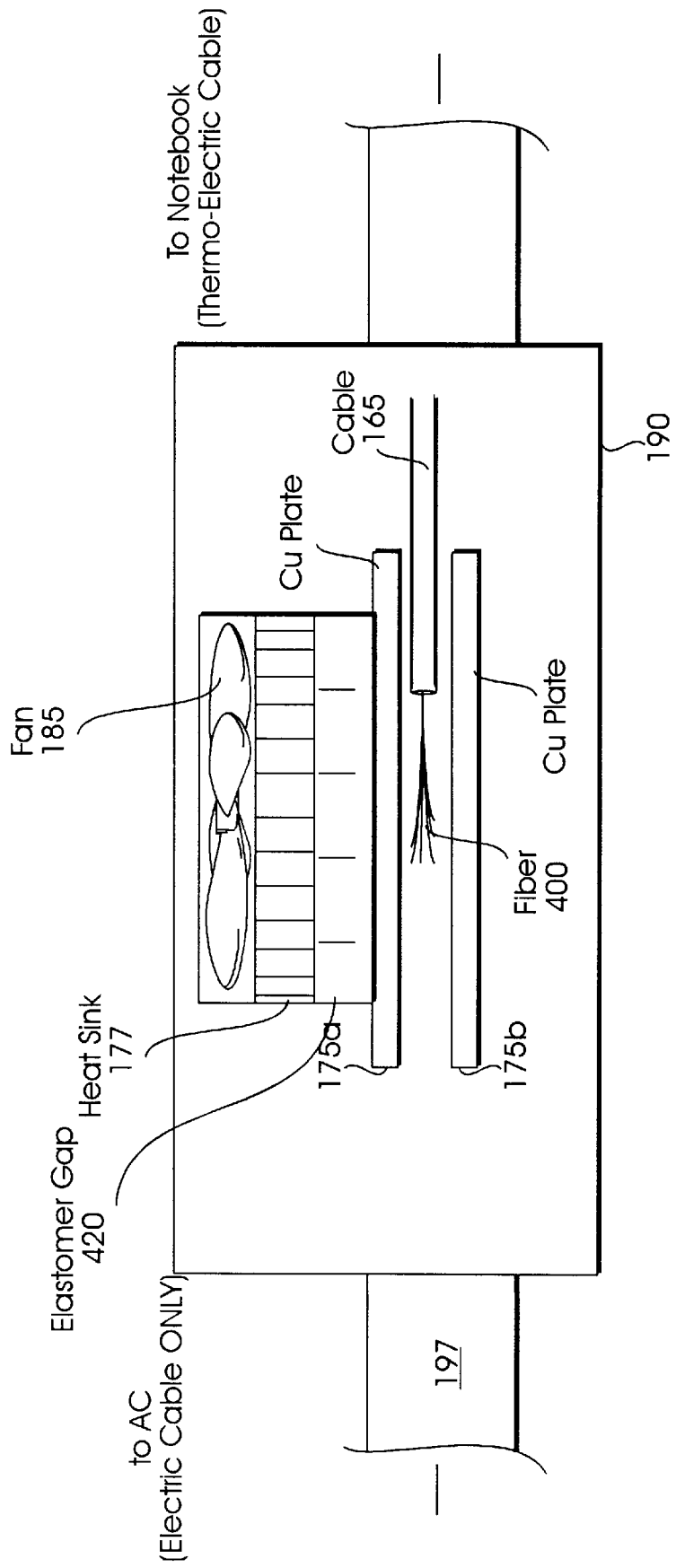
FIG. 4 illustrates one embodiment of a heat dissipating power supply brick using thermally conductive fibers.

FIG. 4 illustrates the thermal components in an alternate embodiment of the power supply brick 190 which utilizes a thermally conductive fiber 400 to remove heat from the portable computing device 105. In this embodiment, the thermal-electrical cable 165 includes thermally conductive fibers 400 as the flexible heat conductor. Carbon based fibers or any other flexible thermally conductive fiber may be used.

In the embodiment of FIG. 4, the fan 185 is again affixed to the housing of the power supply brick 190. The heat sink 177 is a metal structure such as copper or aluminum. In one embodiment, the fan 185 has an inlet on the top surface of the brick 190 and one or more outlets on the sides of the fan 185 such that air is blown over the heat sink 177 and expelled to the sides. An elastomer gap 420 provides a conforming surface which reduces thermal contact resistance between the heat sink 177 and the plate 175a. Alternately, a thermal tape, a thermal grease, or any other suitable thermal interface material may be used for such thermal connections.

Figure 5A:
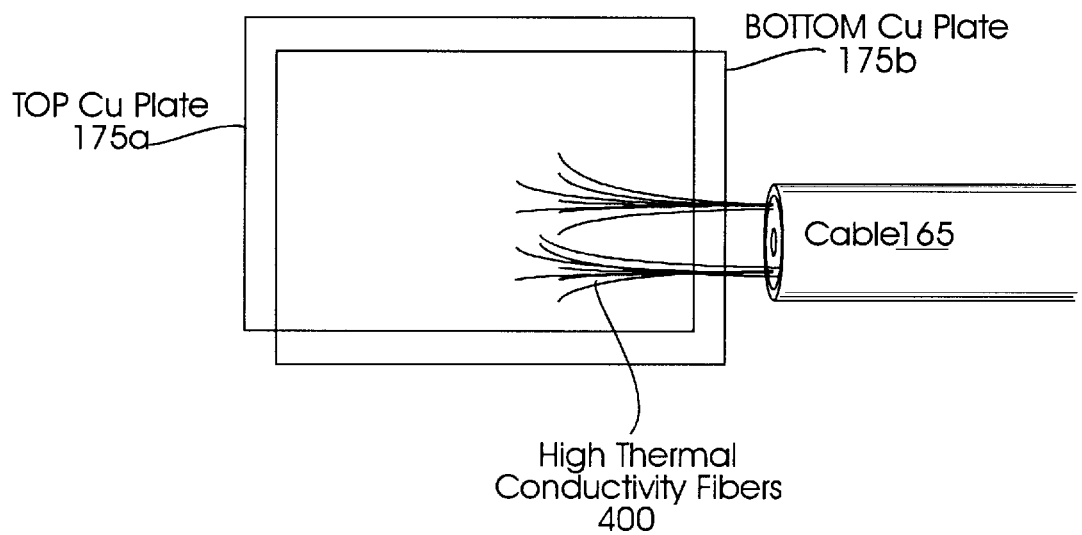
FIG. 5a illustrates a technique for thermally coupling an end of the thermal cable to heat conductive plates for one embodiment of the present invention.

FIG. 5a illustrates one technique for thermally coupling an end of the fibers 400 of the thermal-electrical cable 165 to the heat dissipation plates 175a and 175b. The fibers 400 fan out over and are affixed to the surfaces of the plates 175a and 175b. A thermal epoxy, solder, or any other known bonding technique may be used. This fiber/plate combination may be used as a thermal mating connector in several embodiments of the present invention similarly to the thermal mating techniques illustrated in FIGS. 3a and 3b. Specifically, the technique of FIG. 5a may be used to form a thermal mating connector at either end of the thermal-electrical cable 165, or in an abutted attachment such as that shown in FIG. 2.

Figure 5B:
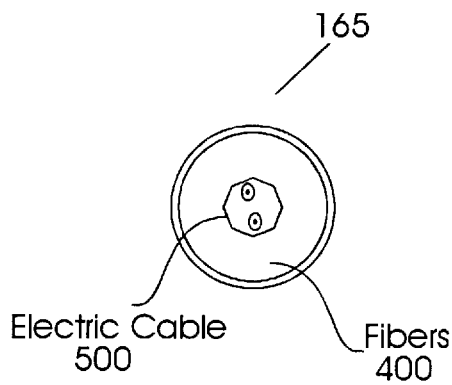
FIGS. 5b and 5c illustrate a thermal and electrical cable used with one embodiment of the present invention.
Figure 5C:
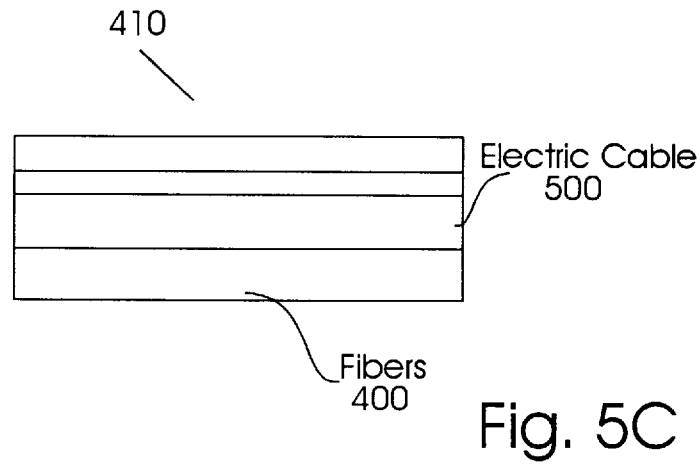

FIGS. 5b and 5c illustrate one arrangement which may be used for the thermal-electric cable 165 when thermally conductive fiber 400 is used. An electric cable 500 includes an insulation separating electrical conductors from the fibers 400. The electric cable, insulation, and heat conductive fibers are all known in the art. The electrical conductors are separated from the fibers 400 at the end of the cable 165 so the appropriate thermal and electrical connections can be made.

Thus, the present invention provides a number of air flow heat exchanger solutions for a portable computing device and a docking station. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A heat exchange apparatus comprising:
    a heat transfer element having a first portion for thermally coupling to an electronic component, the heat transfer element comprising a heat pipe;
    a heat dissipating cable connector having a heat dissipation mechanism removably thermally coupled to a second portion of the heat transfer element.

2. The heat exchange apparatus of claim 1 further comprising:
    a first mating connector thermally coupled to the heat transfer element; and
    a second mating connector configured to mate with the first mating connector and thermally coupled to the heat dissipation mechanism.

3. The heat exchange apparatus of claim 2 wherein the heat dissipation mechanism comprises:
    a heat sink thermally coupled to the second mating connector.

4. The heat exchange apparatus of claim 3 wherein the heat dissipation mechanism further comprises:
    a fan mounted in the heat dissipating cable connector adjacent to the heat sink.

5. The heat exchange apparatus of claim 4 further comprising:
    a thermal cable thermally coupling the second mating connector to the heat dissipation mechanism.

6. The heat exchange apparatus of claim 1 further comprising:
    a thermal cable including a flexible thermal conductor thermally coupled to the heat dissipation mechanism and having a plug end;
    a receptacle configured to removably mechanically engage the plug end and having a mating connector configured to thermally couple the flexible thermal conductor to the heat transfer element when the receptacle engages the plug end of the thermal cable.

7. An apparatus comprising:
a base housing for a computing device;
an electronic component disposed within the base housing;
a receptacle formed at an exterior surface of the base housing, the receptacle having a thermal mating mechanism; and
a heat transfer element thermally coupling the electronic component to the thermal mating mechanism.

8. The apparatus of claim 7 further comprising:
a heat dissipating cable connector removably thermally coupled to the thermal mating mechanism of the receptacle.

9. The apparatus of claim 8 wherein the heat dissipating cable connector comprises a heat dissipation brick, and wherein the apparatus further comprises:
a thermal cable having a brick end connected to the heat dissipation brick and a plug end adapted to mechanically engage the receptacle, the thermal cable having a flexible thermal conductor thermally coupled to a second thermal mating mechanism, the second thermal mating mechanism being adapted to engage the thermal mating mechanism of the receptacle, the thermal cable thermally coupling the thermal mating mechanism to the heat dissipation brick.

10. The apparatus of claim 9 further comprising:
a power supply circuit disposed within the heat dissipation brick and coupled to a plurality of electrical conductors in the thermal cable; and
a power supply cable having a first end connected to the heat dissipation brick and having a second end forming an electrical plug end adapted to engage an electrical outlet.

11. The apparatus of claim 10 wherein the heat dissipation brick further comprises:
a heat sink thermally coupled to the flexible thermal conductor at the brick end of the thermal cable.

12. The apparatus of claim 11 wherein the heat dissipation brick further comprises:
a fan mounted adjacent to the heat sink.

13. A cable comprising:
a first plug end having a plurality of electrical connectors and a mating thermal connector;
a thermal-electrical cable including a plurality of electrical conductors coupled to the plurality of electrical connectors, the thermal-electrical cable also including a flexible thermal conductor thermally coupled to the mating thermal connector; and
a power supply brick including a power supply circuit coupled to the plurality of electrical conductors and a heat dissipation mechanism thermally coupled to the flexible thermal conductor.

14. The apparatus of claim 13 wherein the thermal-electrical cable comprises:
a flexible heat pipe; and
an insulator surrounding the flexible heat pipe.

15. The apparatus of claim 13 wherein the thermal-electrical cable comprises:
a plurality of thermally conductive fibers; and
an insulator surrounding the plurality of thermally conductive fibers.

16. A heat exchange mechanism comprising:
a heat transfer means for transferring heat from a component within a computing device to a receptacle; and
a power cable heat dissipation means thermally coupled to the heat transfer means through the receptacle.

17. The heat exchange mechanism of claim 16 further comprising a power cable heat transfer means for transferring heat from the receptacle through a section of power cable to the power cable heat dissipation means.

18. The heat exchange mechanism of claim 17 wherein the power cable heat dissipation means is contained in a power supply brick.

19. A computing device comprising:
a base including a thermal-electrical receptacle having a first plurality of electrical connectors and a first thermal connector;
a plug including a second plurality of electrical connectors configured to engage the first plurality of electrical connectors, the plug also including a second thermal connector configured to thermally engage the first thermal connector;
a thermal-electrical cable containing a plurality of electrical conductors coupled to the second plurality of electrical connectors, the thermal-electrical cable also including a flexible thermal conductor thermally coupled to the second thermal connector;
a power supply housing containing a power supply circuit connected to the plurality of electrical conductors and a heat dissipation mechanism thermally coupled to the flexible thermal conductor; and
a power supply cable coupling the power supply circuit to a second plug.

* * * * *